Nov. 19, 1963  A. B. STOUT, JR  3,111,392

ELECTRICAL CONDUCTIVITY ANALYZER FOR ACID GASES

Filed May 24, 1961

INVENTOR.
ALLISON B. STOUT, Jr.

BY *Mallinckrodt and Mallinckrodt*

ATTORNEYS 3,111,392
ELECTRICAL CONDUCTIVITY ANALYZER FOR ACID GASES
Allison B. Stout, Jr., Salt Lake County, Utah, assignor to Kennecott Copper Corporation, New York, N.Y., a corporation of New York
Filed May 24, 1961, Ser. No. 112,293
6 Claims. (Cl. 23—255)

This invention relates to apparatus for quantitatively analyzing acid gases, especially atmospheric air contaminated or likely to be contaminated with $SO_2$, $SO_3$, HCl, HF, etc. It is particularly concerned with providing completely automatic apparatus of this type capable of performing and recording analyses at regular intervals over extended periods of time without attention.

Contamination of the atmosphere with noxious gases is a matter of great concern. Determinations of the extent of contamination made at frequent intervals on a continuing basis are essential for proper control. Such determinations are generally made on the basis of change in electrical conductivity of a liquid through which a sample of the atmosphere or other gas to be tested has been bubbled, a so-called electrical conductivity cell being used for the purpose.

Automatically operated, electrical conductivity cell apparatus available heretofore for this purpose has been exceedingly bulky, costly, and temperamental. Yet, anything short of automatic operation is impractical, considering the continuing nature of the work and the frequency with which determinations must be made.

The principal object in the making of this invention was to provide completely automatic, reliable, relatively inexpensive, and compact, electrical conductivity cell apparatus for periodically taking samples of the atmosphere or other gas and for analyzing such samples and recording the analyses as and when taken.

Important features of the invention are the provision of a normally open valve controlling passage of a suitable liquid reagent from a gravity feed storage reservoir to a hydrostatically related measuring chamber adapted to contain a predetermined quantity of the reagent, and the provision of a normally closed valve controlling passage of the reagent from the measuring chamber to the conductivity cell. Means are provided for periodically closing the first valve and opening the second valve, so reagent from the measuring chamber will recharge the conductivity cell following each analysis and each drainage of the used reagent therefrom.

It is preferred, for the sake of compactness and economy, that the two valves be combined as a single, two-way valve.

Another feature is the provision of an electrical timing arrangement especially adapted to control the various procedural steps in predetermined, timed sequence.

There is shown in the accompanying drawing apparatus representing what is presently regarded as the best mode of carrying out the invention.

Figure 1:
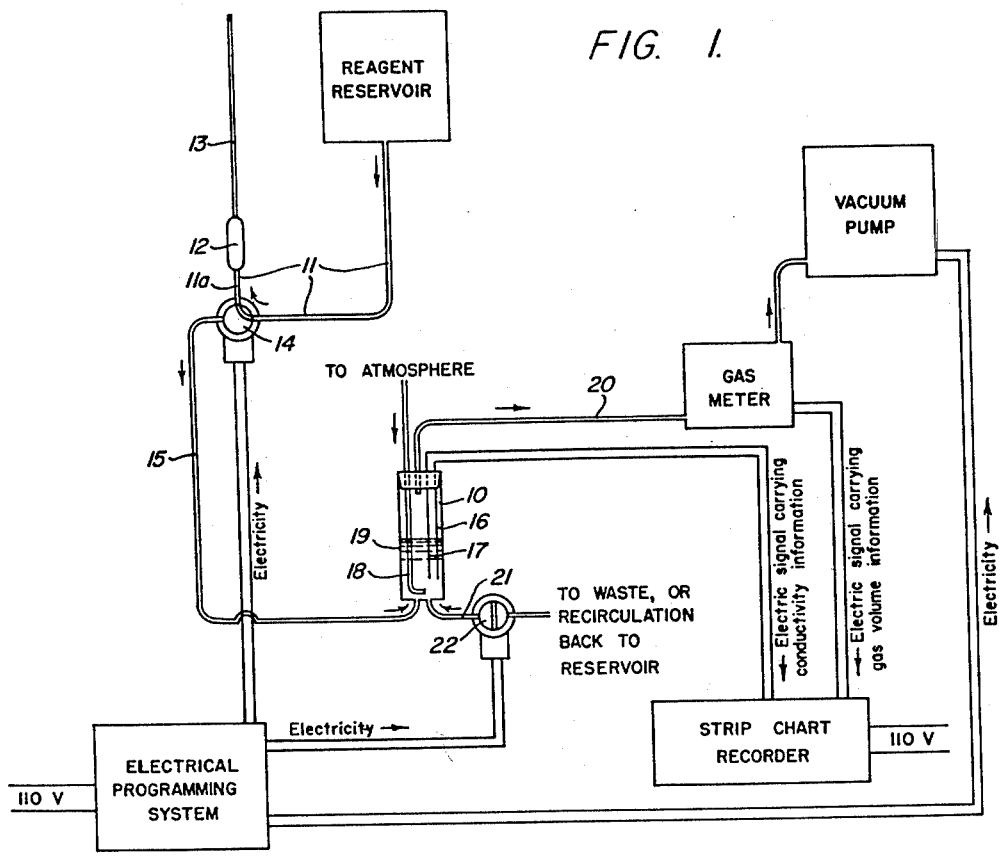
Figure 2:
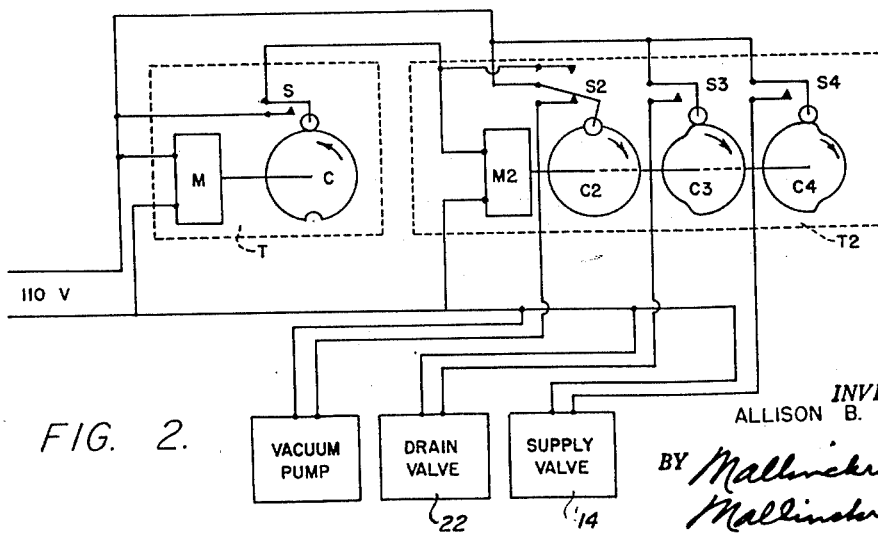

In the drawing:
FIG. 1 is a schematic representation of an automatically controlled electrical conductivity analyzer in accordance with the invention, which is specifically adapted for periodically making and recording determinations of the extent of acid gas pollution of the atmosphere; and
FIG. 2, a schematic representation and wiring diagram of the timing and control components of the analyzer of FIG. 1.

Referring to the drawing:
In the form illustrated, the apparatus of the invention is adapted to take samples of the atmosphere periodically, e.g. every half hour, on a continuing basis and to subject such samples to analyses in a standard type of electrical conductivity cell 10, the results being recorded on a standard strip chart recorder, as indicated in FIG. 1. All of this is done automatically.

A supply of a suitable reagent, usually water made very slightly acid by the addition of a small amount of dilute acid to guard against alkalinity, is maintained in a reservoir, see FIG. 1, for gravity feed by way of a conduit 11 to a measuring chamber 12 located below such reservoir but above conductivity cell 10. Measuring chamber 12 has an elongate, open-ended, upward continuation 13 of very small diameter, for example, a capillary tube, rising through the height of the reservoir in conventional manner as an air vent.

A feature of the invention resides in the fact that a normally open valve 14 is interposed in conduit 11, so that a hydrostatic balance will be achieved between reservoir and measuring chamber and so that the latter will be normally filled and have provision for maintaining volume constant despite liquid contraction or expansion.

Valve 14 is a two-way valve, as indicated, making both inflow and outflow connections with conduit 11 and making an outflow connection with a conduit 15 leading into cell 10. The normal setting of the valve establishes flow communication between both parts of conduit 11, as shown in FIG. 1, while the alternative setting establishes flow communication between measuring chamber 12 and conduit 15 by way of a common portion 11a of conduit 11. Valve 14 closes passage between measuring chamber and cell when passage between reservoir and measuring chamber is open and vice versa.

It will be realized that the action of the one two-way valve 14 can also be achieved, but at greater cost and inconvenience, by the provision of individual valves in individual conduits.

The electrical conductivity cell 10 is of standard construction, having spaced electrodes 16 and 17 and a gas injector tube 18, all terminating below the level of the measured body of reagent 19 which is introduced into the cell from measuring chamber 12 for each test performed. Tube 18 extends to the location where atmospheric air is to be sampled. The cell is tightly corked, and a gas exhaust tube 20 extends from communication with the interior of the cell to a vacuum pump, as indicated in FIG. 1, a gas meter being interposed in the line to indicate the volume of atmospheric air bubbled through the reagent 19 during operation of the vacuum pump for any given test.

Drainage of the used body of reagent from cell 10 following any given test is accomplished through drain line 21 under the control of a normally closed valve 22.

Automatic control of the apparatus so far described is carried out in predetermined timed sequence by any suitable programming system and any suitable control instrumentalities. It is preferred that these be electrically operated. A very satisfactory system is illustrated schematically in FIG. 2.

As there illustrated, an interval timer T is provided by an electric motor M operating a timing cam C which serves to maintain a switch S open, except at 30 minute intervals when it is closed momentarily. Motor M is powered continuously from the usual power supply, as indicated, and is desirably geared to turn cam C two revolutions per hour. Switch S controls a circuit arranged to carry electricity from such power supply to a sequence timer T2.

This sequence timer is provided by a second electric motor M2 and a series of three timing cams C2, C3, and C4 mounted in common on a shaft driven by such motor M2 at desirably one revolution per minute. These cams control three switches, S2, S3, and S4, respectively. Switch S2 is double throw type, closing, on one throw, a local circuit which energizes the vacuum pump, and closing, on the other throw, a holding circuit which supplies power to motor M2 independently of interval timer switch S. The other switches S3 and S4 are single throw type controlling, respectively, local circuits which energize drain valve 22 and supply valve 14, respectively. These valves are provided with usual electrically motivated operating means, such as solenoids, for the purpose.

The cams and switches are so arranged that, when motor M2 is energized each time switch S is closed by cam C of the interval timer T, switch S2 of the sequence timer T2 is thrown by cam C2 to halt operation of the vacuum pump and to close the holding circuit which continues the operation of motor M2. Continued operation of the sequence timer causes cam C3 to close switch S3 for a predetermined period of time. This opens normally closed drain valve 22 and permits drainage of used reagent from cell 10. Thereupon, switch S4 is thrown closed for a predetermined time period by its cam C4 to move supply valve 14 from its normal position to a position closing flow passage between reservoir and measuring chamber and opening flow passage between measuring chamber and cell.

The time periods are made adequate to permit complete drainage of used reagent from the cell and replacement thereof by the full measured quantity of fresh reagent.

When cam C2 executes a complete revolution, switch S2 is thrown back to its original position closing the circuit powering the vacuum pump and opening the circuit which holds motor M2 in operation, whereupon atmospheric air is bubbled through the body of fresh reagent in cell 10 until motor M is again energized by the closing of switch S of the interval timer and a new cycle of operation is initiated by the sequence timer.

It is a feature of the invention that the vacuum pump is started and stopped as required, rather than running continuously.

Both the gas meter and the electrodes 16 and 17 are electrically connected with a strip chart recorder, as indicated in FIG. 1, so that correlated gas volume and electrical conductivity measurements are made continuously throughout each period of operation of the system. This arrangement is a conventional one, for example there being provided in the gas meter a switch (not shown), which is closed each time a given volume of air passes through the meter and which, when closed, energizes a solenoid-operated pen (not shown) of the recorder.

Whereas there is here illustrated and described a certain preferred form of apparatus which I presently regard as the best mode of carrying out my invention, it should be understood that various changes may be made without departing from the inventive concepts particularly pointed out and distinctly claimed herebelow.

I claim:
1. An electrical conductivity analyzer for acid gases, comprising a conductivity cell equipped with means for continuously measuring the electrical conductivity of liquid periodically filling the cell; a gravity-feed reservoir for a liquid reagent; a measuring chamber placed below said reservoir but above said cell and having a small diameter, open-ended tubular extension thereof of insignificant capacity extending upwardly to a height commensurate with that of the reservoir so as to hydrostatically relate measuring chamber and reservoir; conduit means leading from reservoir to measuring chamber; conduit means leading from measuring chamber to conductivity cell; valve means controlling flow through the first and second conduit means; a drain for the conductivity cell; a normally closed valve controlling flow through said drain; means for operating said valve means controlling flow through said first and second conduit means so that reagent from the measuring chamber will fill the conductivity cell to a predetermined level; means for bubbling a gas through the reagent in the conductivity cell; means for measuring the volume of gas bubbled through the reagent; means for opening and closing the valve which controls drainage from the conductivity cell; and automatic means for periodically controlling the means for operating the valve means, the drainage valve opening and closing means, the gas-bubbling means, and the conductivity measuring means in predetermined timed sequence.

2. The analyzer of claim 1 wherein the valve means which controls flow between reservoir and measuring chamber, and measuring chamber and conductivity cell comprises a single two-way valve, there being a single conduit leading from the latter to the measuring chamber; and wherein the means for operating said valve means is a single means for operating said two-way valve.

3. The analyzer of claim 1, wherein the means for bubbling a gas through the reagent in the conductivity cell comprises a vacuum pump and conduit means connected therewith and with a source of the gas to be analyzed and with the cell, for drawing said gas into the cell; and wherein the automatic control means includes means for starting and stopping said vacuum pump.

4. The analyzer of claim 3, wherein the vacuum pump and the means for controlling the valves are electrically operated and are provided with independent circuits for the supply of electricity thereto; and wherein the automatic control means comprises an electrical timing assembly for opening and closing said circuits in predetermined timed sequence.

5. The analyzer of claim 4, wherein the electrical timing assembly includes an electrically motivated interval timer, and an electrically motivated sequence timer, the former being arranged to control supply of electricity to the latter and said latter being provided with means for controlling the supply of electricity to itself during the sequence controlled by it.

6. In gas analysis apparatus which includes an analysis cell, means for introducing a measured volume of gas into said cell, and means for draining the cell following each analysis, means for introducing a measured volume of a liquid reagent through which said gas is passed into the cell, comprising a reagent reservoir placed above the cell; a reagent measuring chamber placed below the reservoir but above the cell; open-ended conduit means of insignificant capacity leading from the top of the chamber to a height substantially adjacent the top of the reservoir; conduit means leading from the bottom of the reservoir to the bottom of the measuring chamber; conduit means leading from the bottom of the measuring chamber to the cell; normally open valve means disposed to control flow through the first conduit means; normally closed valve means disposed to control flow through the second conduit means; means for controlling said valve means in predetermined timed sequence; and means continuously measuring conductivity of said liquid reagent during the passage of gas therethrough.

References Cited in the file of this patent
UNITED STATES PATENTS

| | | |
|---|---|---|
| 2,593,878 | Haines et al. | Apr. 22, 1952 |
| 2,761,595 | Vergers | Sept. 4, 1956 |
| 2,895,652 | Rockriver | July 21, 1959 |
| 2,934,408 | Brooke | Apr. 26, 1960 |
| 2,949,345 | Clauss | Aug. 16, 1960 |

OTHER REFERENCES

Thomas et al.: "Ind. and Eng. Chem.," 18 383–387 (1946) (Anal. Ed). (Copy in Sci. Lib.)